United States Patent [19]
Lamarche

[11] 4,360,352
[45] Nov. 23, 1982

[54] EXTENDED TRAVEL VIBRATION DAMPER ASSEMBLY

[75] Inventor: Paul E. Lamarche, Utica, Mich.

[73] Assignee: Borg-Warner Corporation, Chicago, Ill.

[21] Appl. No.: 248,116

[22] Filed: Mar. 27, 1981

[51] Int. Cl.³ ............................................. F16D 3/14
[52] U.S. Cl. ........................................ 464/64; 464/68; 192/106.2
[58] Field of Search ............. 464/64, 67, 68, 62, 464/66; 192/106.2, 106.1

[56] References Cited

U.S. PATENT DOCUMENTS

| | | | |
|---|---|---|---|
| 2,149,887 | 3/1939 | Hickman | 64/27 C |
| 2,574,573 | 11/1951 | Libby | 64/27 C |
| 4,138,003 | 2/1979 | Malloy | 464/64 X |
| 4,139,995 | 2/1979 | Lamarche | 464/64 |
| 4,188,805 | 2/1980 | Fall et al. | 464/64 |
| 4,188,806 | 2/1980 | Fall et al. | 464/64 |
| 4,232,534 | 11/1980 | Lamarche | 464/68 |
| 4,240,532 | 12/1980 | Blomquist | 192/106.2 X |
| 4,279,132 | 7/1981 | Lamarche | 464/64 |
| 4,304,107 | 12/1981 | Fall et al. | 464/64 |

FOREIGN PATENT DOCUMENTS 166939  1/1921  United Kingdom ............... 64/27 C

*Primary Examiner*—Stuart S. Levy
*Assistant Examiner*—Daniel P. Stodola
*Attorney, Agent, or Firm*—James A. Geppert

[57] ABSTRACT

A torsional vibration damper assembly for extended travel of the damping assembly where the assembly is utilized in the limited space found in a housing of a torque converter between the forward converter housing wall and the turbine shell. The damper assembly is compact with an internal splined connection to the turbine hub and having an annular clutch plate secured to the periphery of the damper assembly to engage the other clutching components for a lock-up clutch. Three floating equalizers are journalled on a hub plate, with each equalizer and the hub having three radial arms, and damper springs in groups of four are positioned between the hub arms and/or equalizer arms. A spring retainer housing provides the torque input from the torque converter housing and has three pairs of axially aligned drive straps in the path of the damper springs.

6 Claims, 10 Drawing Figures

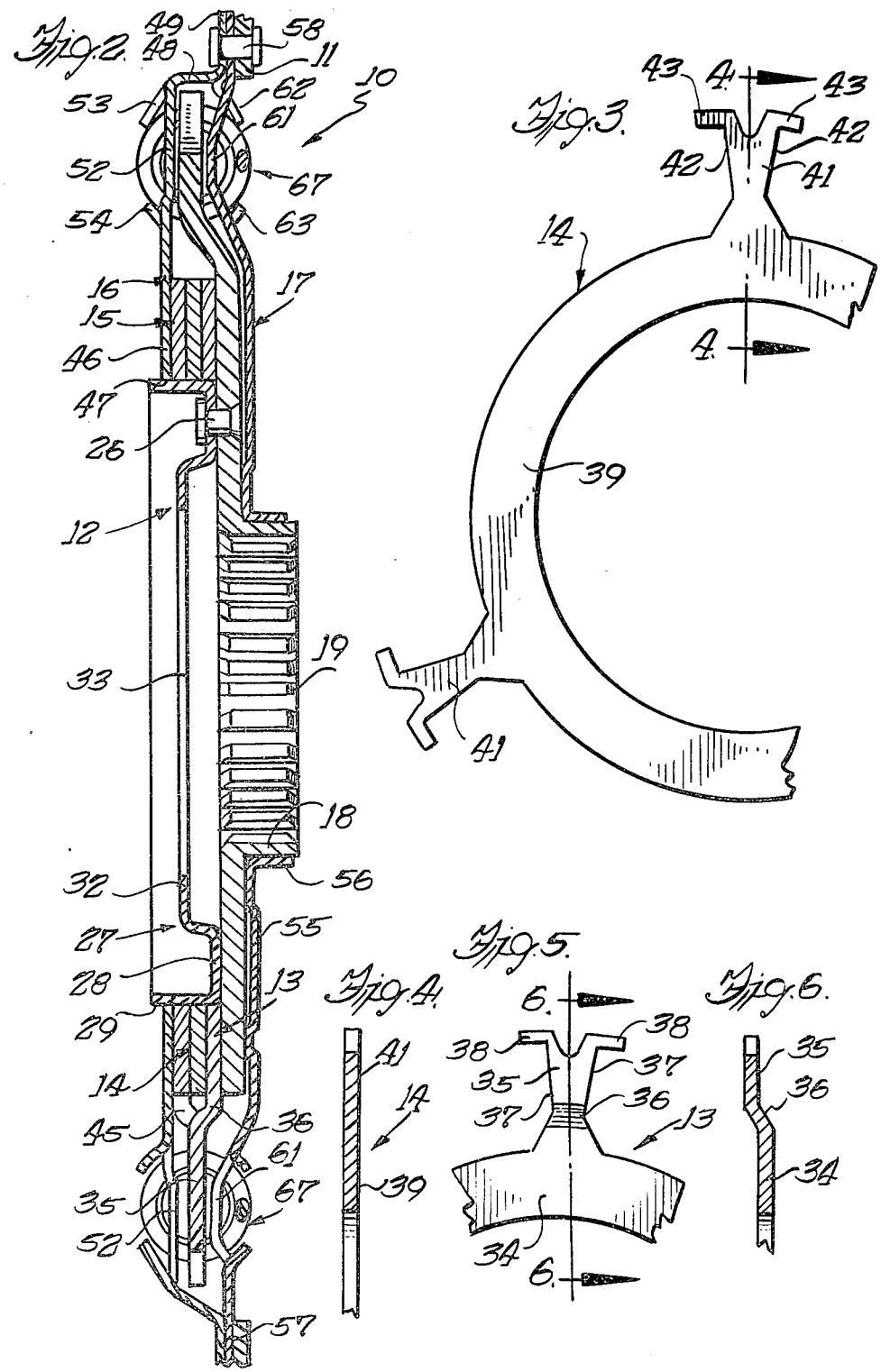

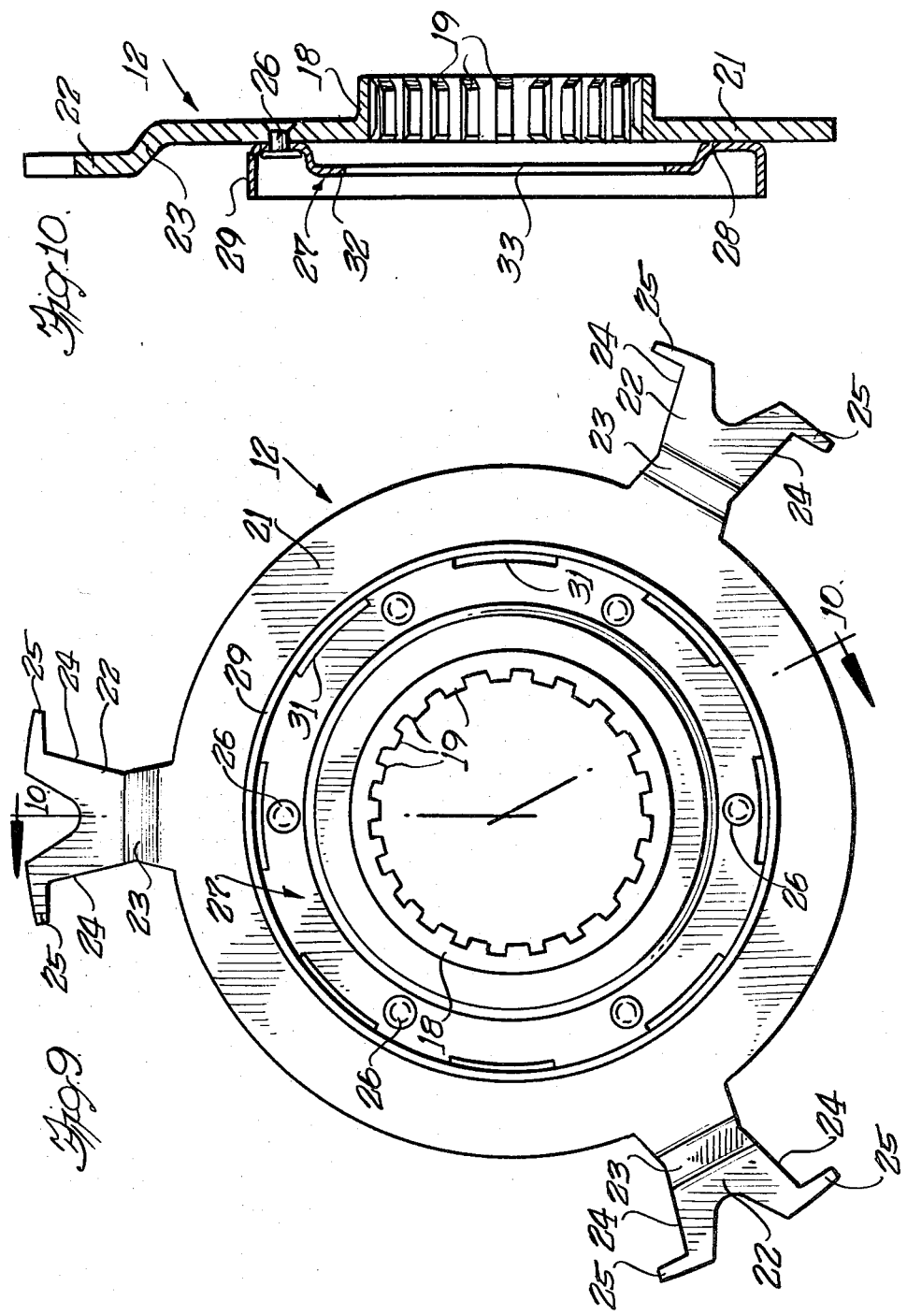

4,360,352

EXTENDED TRAVEL VIBRATION DAMPER ASSEMBLY

BACKGROUND OF THE INVENTION

In a manual transmission employing a friction clutch in the drive train between the engine and the transmission, a torsional vibration damper is conventionally inserted in the clutch assembly to neutralize the torsional vibrations emanating from the engine which would otherwise result in undesirable characteristics in the transmission. The torque converter of an automatic vehicle transmission effectively hydraulically dampens the torsional vibrations in the system without a separate damper assembly. However, if a lock-up clutch is inserted in the torque converter to provide a direct drive between the impeller and turbine of the torque converter to reduce slippage and increase efficiency at higher speeds, the hydraulic damping action of the torque converter is obviated, and a mechanical damper is again required in the lock-up clutch.

SUMMARY OF THE INVENTION

The present invention comprehends the provision of a torsional vibration damper assembly utilized in a torsional coupling or clutch assembly which provides for a relatively low rate, high amplitude deflection between the driving and driven members. This assembly includes a hub having radial arms, three floating equalizers journalled on the hub and a housing formed of spring retainer plates and operatively connected to the driving or input member. Damper springs in groups of four spring sets are arranged in three groups acting in parallel in the damper to provide an effective extended travel for the damper.

The present invention also comprehends the provision of a novel damper assembly wherein the three floating equalizers are all positioned on one side of the hub and the hub arms and the arms of two of the three equalizers are suitably offset so that the hub arms and equalizer arms all lie in a substantially common plane in the path of the damper springs. Also, the spring retainer plates include inwardly offset drive straps adapted to engage adjacent damper springs.

Further objects are to provide a construction of maximum simplicity, efficiency, economy and ease of assembly and operation and such further objects, advantages and capabilities as will later more fully appear and are inherently possessed thereby.

DESCRIPTION OF THE DRAWINGS

FIG. 2 is a cross sectional view taken on the irregular line 2—2 of FIG. 1.

FIG. 3 is a partial rear elevation view of the centrally located floating equalizer.

FIG. 4 is a cross sectional view taken on the line 4—4 of FIG. 3.

FIG. 5 is a partial rear elevational view of an end equalizer.

FIG. 6 is a cross sectional view taken on the line 6—6 of FIG. 5.

FIG. 9 is a front plane view of the hub plate assembly.

FIG. 10 is a cross sectional view taken on the irregular line 10—10 of FIG. 9.

DESCRIPTION OF THE PREFERRED EMBODIMENT

Figure 1:
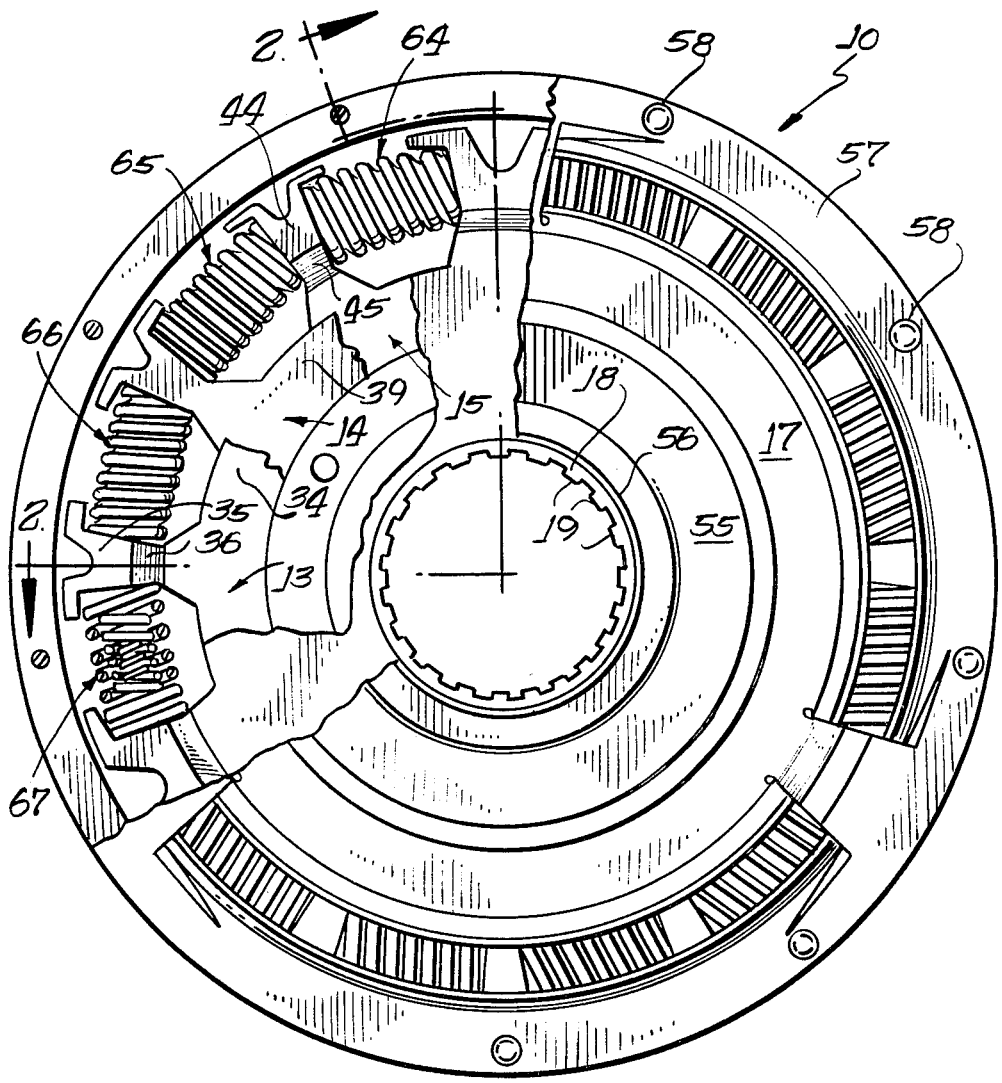
FIG. 1 is a rear elevational view with portions broken away of the vibration damper assembly of the present invention.

Referring more particularly to the disclosure in the drawings wherein is shown an illustrative embodiment of the present invention, FIGS. 1 and 2 disclose a torsional vibration damper assembly 10 which is shown secured to a torque input member, such as a clutch plate 11 carrying one or two friction linings (not shown) for a clutch assembly. The damper assembly includes a hub 12, a plurality of floating equalizers 13, 14, 15 and a housing formed of a pair of spring retainer plates 16 and 17.

The hub 12 includes a barrel 18 having a central passage with internal splines 19 adapted to receive the splined end of a transmission input shaft or the exterior splined surface of a torque converter turbine hub (not shown). A hub flange 21 extends radially outwardly from one end of the barrel 18 (FIGS. 9 and 10) and terminates in three circumferentially equally spaced hub arms 22; each arm being forwardly offset at 23 with opposed spring engaging surfaces 24,24 and terminating in circumferentially oppositely extending fingers 25,25. On the forward surface of the flange 21 is secured by rivets 26 a generally cup-shaped guide ring or spacer cup 27 having an annular portion 28 abutting the hub flange, an outer forwardly extending flange 29 which is pierced at a plurality of circumferentially equally spaced locations 31 to provide arcuate cylindrical segments acting as a guide surface for the floating equalizers 13, 14, 15. The inner edge 32 of the ring or spacer cup 27 is forwardly offset to define a central opening 33 axially aligned with the splined opening of the hub barrel 18.

The floating equalizer 13 (FIGS. 5 and 6) includes an annular body or ring 34 journalled on the cup spacer 27 and having three circumferentially equally spaced arms 35 forwardly offset at 36 and provided with oppositely disposed spring engaging surfaces 37,37 terminating in circumferentially oppositely extending fingers 38. The central equalizer 14 (FIGS. 3 and 4) is substantially flat with an annular body 39 and three radial arms 41 having diverging spring engaging edges 42,42 terminating in fingers 43. The equalizer 15 is substantially identical to equalizer 13 except the arms 44 are offset rearwardly at 45.

Figure 8:
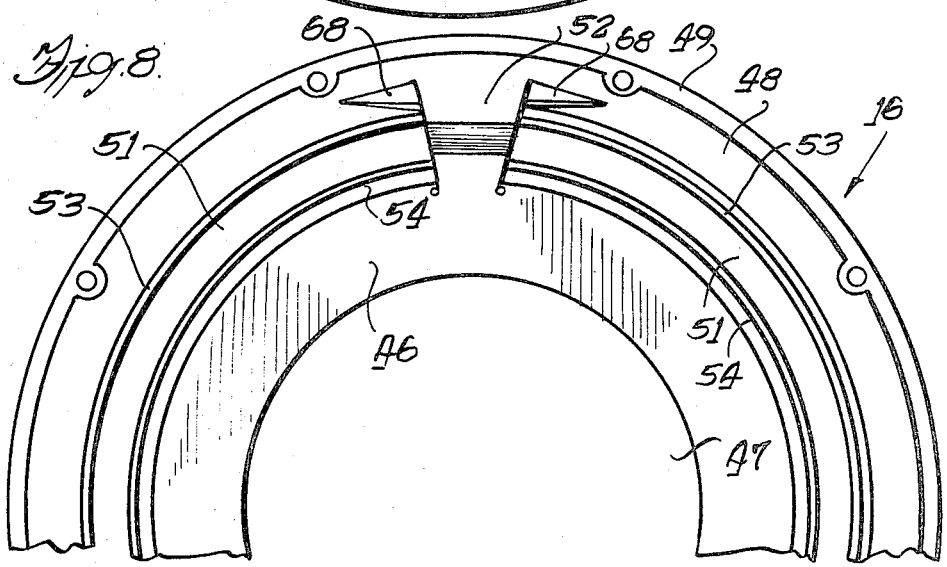
FIG. 8 is a partial rear elevational view of the front spring retainer plate.

The front spring retainer plate 16 (FIG. 8) has a substantially flat body 46 with a central opening 47 receiving the outer flange 29 of the spacer cup 27 and a rearwardly extending peripheral portion 48 terminating in a radial lip 49. Three arcuate slots 51 are formed adjacent the portion 48 separated by three inwardly offset drive straps 52. The slots 51 are defined by outer forwardly and inwardly inclined spring retaining lips 53 and by inner forwardly and outwardly inclined lips 54.

Figure 7:
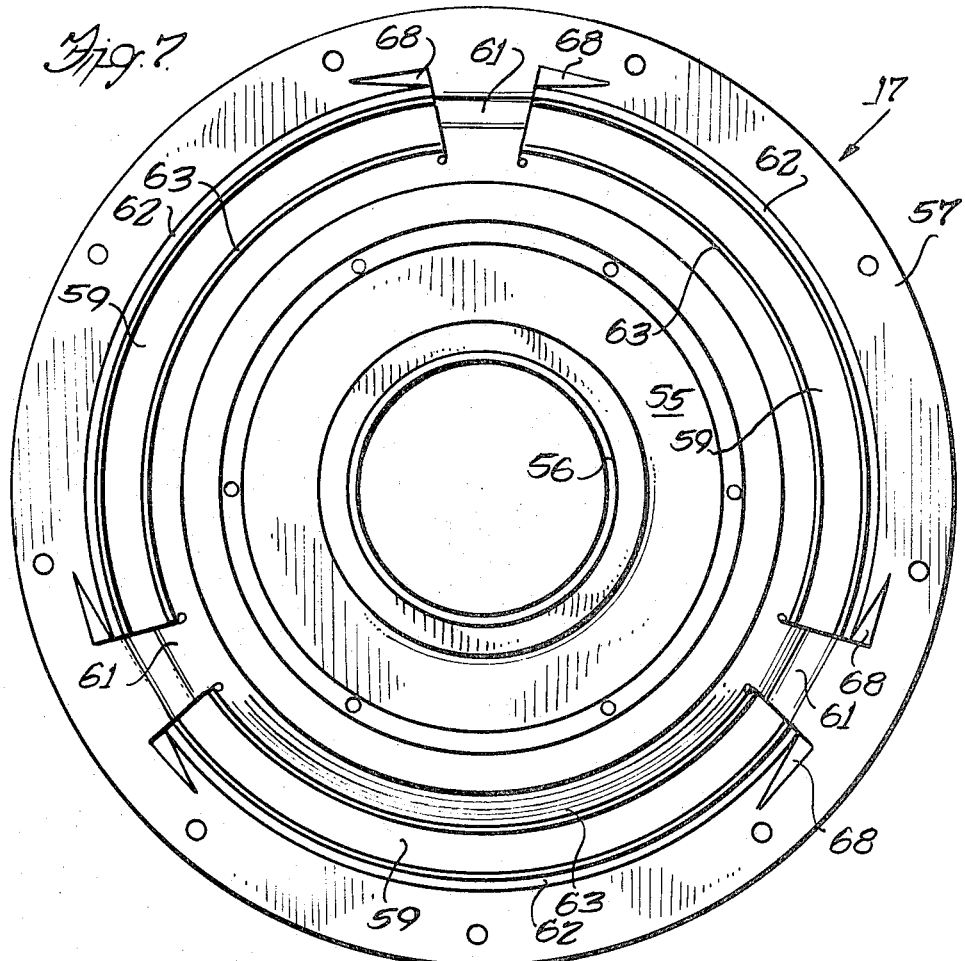
FIG. 7 is a rear elevational view of the rear spring retainer plate.

The rear spring retainer plate 17 (FIG. 7) has a flat body 55 generally parallel to the hub flange 21 with a rearwardly extending flange 56 encompassing the hub barrel 18. The outer edge 57 of plate 17 abuts the lip 49 of plate 16 and is secured thereto and to the clutch plate 11 by rivets 58. Three circumferentially equally spaced arcuate slots 59 are separated by inwardly offset drive straps 61; the slots and straps being axially aligned with the slots 51 and drive straps 52 of the plate 16. The arcuate slots 59 are also defined by outer lips 62 and inner lips 63 to retain damper springs therein.

Four damper spring sets 64, 65, 66 and 67 are positioned within each pair of arcuate slots between adjacent drive straps 52, 61; with one arm of each equalizer being positioned in each slot. The arms of the equalizers and the hub arms are all located in a common plane between the spring retainer plates 16 and 17, with the hub arms 22 being axially aligned with the pairs of drive straps 52, 61 where torque is not applied.

With the assembly in the position shown in FIG. 1, when torque is applied by the clutch plate 11 to the spring retainer plates 16,17 secured thereto in a counter-clockwise direction, the drive straps 52,61 engage and compress the spring sets 64, which in turn act on the arms 44 of equalizer 15. Movement of equalizer 15 acts to compress the spring sets 65 which act on arms 41 of central equalizer 14, which movement thereof compresses spring sets 66 that act on arms 35 of equalizer 13. Movement of arms 35 compresses spring sets 67 which act on the hub arms 22 to rotate the hub and either rotate the transmission input shaft of a manual clutch or the turbine hub of a torque converter housing a lock-up clutch.

Each spring set may consist of one, two or three concentric compression springs, with the fingers on the hub arms and equalizer arms acting to control the spring sets so they do not buckle or deform radially outwardly. Also, the drive straps 52,61 have re-entry ramps 68 which both act as retainers for the springs and as inclined planes to prevent outward movement of the springs as the straps are moved away from the hub arms. Also, if desired, a one-way roller clutch may be interposed between the hub barrel 18 splined to the turbine hub and an outer hub body having the hub flange either integral therewith or secured thereto for the purpose of aiding disengagement of the lock-up clutch in the torque converter upon deceleration of the vehicle by the operator.

I claim:

1. A vibration damper assembly to transmit torque between driving and driven members, comprising an input member adapted to engage torque input means, a hub assembly operatively connected to torque output means, and resilient means interposed between the input member and hub assembly, said input means including a pair of spring retainer plates secured together at their peripheries and journalled on said hub assembly, each retainer plate having three circumferentially equally spaced inwardly offset drive straps defining elongated arcuate slots, said hub assembly including an internally splined hub barrel, a hub flange and three circumferentially equally spaced hub arms extending between and axially aligned with said drive straps, a spacer cup secured to said hub flange and providing a forwardly extending flange resulting in a cylindrical guide surface, three floating equalizers journalled on the cylindrical guide surface of the spacer cup, each equalizer having three circumferentially spaced arms lying in substantially the same plane as the hub arms, an arm of each equalizer located between two adjacent hub arms, and said resilient means including a group of four damper spring sets interposed between the retainer plates and between the arms of the equalizers and two adjacent hub arms, said drive straps being inwardly offset in the path of said damper springs.

2. A vibration damper assembly as set forth in claim 1, in which said central equalizer is a flat plate with the arms located in a common plane with said plate, and said other two equalizers are positioned on opposite sides of said central equalizer and have inwardly offset arms to lie in the same plane as the arms of the central equalizer.

3. A vibration damper assembly as set forth in claim 2, in which said hub arms are forwardly offset to lie in the same plane as the equalizer arms.

4. A vibration damper assembly as set forth in claim 1, in which said spacer cup has a flat annular portion abutting and secured to the hub flange, and said forwardly extending flange is located on the outer periphery of the annular portion.

5. A vibration damper assembly as set forth in claim 4, in which said spacer cup has an inner forwardly offset edge defining a central opening axially aligned with the hub barrel, and said forwardly extending flange is pierced at a plurality of circumferentially equally spaced locations adjoining said annular portion.

6. A vibration damper assembly as set forth in claim 1, in which the three groups of spring sets act in parallel with the four spring sets in each group acting in series.

* * * * *